United States Patent [19]

Tomioka et al.

[11] Patent Number: 5,463,016
[45] Date of Patent: Oct. 31, 1995

[54] GRANULAR MATERIAL OF POLYIMIDE PRECURSOR, MIXTURE COMPRISING THE MATERIAL AND PROCESS FOR PRODUCING THE MATERIAL

[75] Inventors: Isao Tomioka, Kyoto; Takeshi Nakano, Ibaraki; Mikio Furukawa; Yoshiaki Echigo, both of Kyoto, all of Japan

[73] Assignee: Unitika Ltd., Hyogo, Japan

[21] Appl. No.: 193,887

[22] Filed: Feb. 9, 1994

Related U.S. Application Data

[63] Continuation of Ser. No. 935,786, Aug. 27, 1992, abandoned.

[30] Foreign Application Priority Data

| Aug. 28, 1991 | [JP] | Japan | 3-244646 |
| Sep. 30, 1991 | [JP] | Japan | 3-280862 |
| Sep. 30, 1991 | [JP] | Japan | 3-280863 |
| Oct. 28, 1991 | [JP] | Japan | 3-309868 |
| Jan. 22, 1992 | [JP] | Japan | 4-032657 |
| Jul. 16, 1992 | [JP] | Japan | 4-213689 |

[51] Int. Cl.⁶ .......................... C08G 77/10; C08G 69/26
[52] U.S. Cl. .................. 528/353; 528/125; 528/128; 528/172; 528/173; 528/176; 528/183; 528/185; 528/188; 528/220; 528/229; 528/350
[58] Field of Search .................. 528/125, 128, 528/172, 173, 176, 183, 185, 188, 220, 229, 350, 353

[56] References Cited

U.S. PATENT DOCUMENTS

| 3,505,295 | 4/1970 | Grunsteidl et al. | 528/353 |
| 3,842,026 | 10/1974 | Dixon et al. | 528/353 |
| 4,535,115 | 8/1985 | Bakshi et al. | 528/353 |
| 4,622,384 | 11/1986 | Manwiller | 528/353 |
| 4,755,555 | 7/1988 | Manwiller | 528/353 |
| 4,778,872 | 10/1988 | Sasaki et al. | 528/353 |
| 4,923,954 | 5/1990 | Klobucar | 528/353 |
| 4,943,682 | 7/1990 | Klobucar | 528/353 |
| 4,978,738 | 12/1990 | Mueller et al. | 528/353 |
| 5,070,181 | 12/1991 | Kawai et al. | 528/353 |
| 5,116,939 | 5/1992 | Fletcher et al. | 528/353 |
| 5,171,828 | 12/1992 | Meterko et al. | 528/353 |

*Primary Examiner*—P. Hampton-Hightower
*Attorney, Agent, or Firm*—Sughrue, Mion, Zinn, Macpeak & Seas

[57] ABSTRACT

This invention provides (1) a granular material of a polyimide precursor, which has excellent solubility in solvents and excellent moldability and from which a polyimide molding having excellent mechanical properties can be produced, (2) a mixture of a granular material of a polyimide precursor with a solvent, in which the polyimide precursor shows excellent storage stability and (3) a process for the production of a granular material of a polyimide precursor, in which a solvent can be easily removed. Particularly provided are a polyimide precursor granular material having an intrinsic viscosity of 0.7 or higher and a polyimide precursor mixture which consists of a polyimide precursor granular polyimide having an intrinsic viscosity of 0.7 or higher and a solvent that does not exhibit a strong-mutual interaction with the polyimide precursor, as well as a process for the production of the polyimide precursor granular material. The granular material of a polyimide precursor can be obtained by allowing a tetracarboxylic dianhydride to undergo polymerization reaction with a diamine in a solvent that does not exhibit a strong mutual interaction with the polyimide precursor.

13 Claims, No Drawings

GRANULAR MATERIAL OF POLYIMIDE PRECURSOR, MIXTURE COMPRISING THE MATERIAL AND PROCESS FOR PRODUCING THE MATERIAL

This is a continuation of U.S. application Ser. No. 07/935,786 filed Aug. 27, 1992, now abandoned.

FIELD OF THE INVENTION

This invention relates to a granular material of a polyimide precursor, to a mixture comprising the granular material and to a process for the production of the granular material.

BACKGROUND OF THE INVENTION

Poly(amic-acid)s are typical polyimide precursors and have been produced, for example, by a low temperature solution polymerization method in an aprotic polar solvent such as N,N-dimethylformamide, N-methyl-2-pyrrolidone, hexamethylphosphoramide, N-methylcaprolactam, dimethyl sulfoxide, N-acetyl-2-pyrrolidone, N,N-dimethylacetamide or the like. In this instance, each of these aprotic polar solvents strongly associates with a polyimide precursor which is the solute in the resulting solution because of the high dipole moment of the solvent. Such a phenomenon has been indicated for instance in *J. Polymer Sci.* (A-1, vol.4, pp.2607–2616, 1966), *J. Polymer Sci.* (A, vol.25, pp.2005– 2020, 1987), *J. Polymer Sci.* (A, vol.25, pp.2479–2491, 1987) and ANTEC 91 Abstract (pp.1742–1745).

As described above, because of the strong solvent-solute mutual interaction, there is presented a problem in that the solvent cannot be easily removed when a polyimide precursor, a polyimide molding, a polyimide coating or the like is prepared from a polyimide precursor solution which has been obtained by a low temperature solution polymerization method. In addition to this, there is another problem in that hydrolysis of a polyimide precursor occurs due to the hygroscopic nature of the aprotic polar solvent, resulting in a reduction of the degree of polymerization of the polyimide precursor (*J. Appl. Polymer Sci.*, vol.8, pp.1039–1051, 1964).

With the object of overcoming such problems, processes have been developed as disclosed in Kogyo Kagaku Zasshi (vol.71, No.9, pp.1559–1564, 1968) and *J. Appl. Polymer Sci.* (vol.11, pp.609–627, 1967), in which a polyimide precursor is formed by a polymerization reaction using a solvent, such as tetrahydrofuran, which has a low boiling point and can be easily removed. According to these processes, a polyimide precursor which does not contain an aprotic polar solvent can be obtained, but the intrinsic viscosity of the product is merely 0.5 to 0.6, and a polyimide molding prepared from the polyimide precursor does not show sufficient mechanical properties.

Other type of processes have been disclosed in JP-B-39-22196, JP-B-39-30060, JP-A-60-221425, JP-A-61-234, JP-A-61-250030 and JP-A-2-18420, in which a polyimide granular material is produced by adding a poor solvent, such as acetone, ethyl acetate or the like, and a cyclization agent, such as pyridine or the like, to an aprotic polar solvent of a polyimide precursor. (The terms "JP-A" and "JP-B" as used herein mean an "unexamined published Japanese patent application" and an "examined Japanese patent publication", respectively) However, since most of the repeating units in these polyimide granular materials are imidated, direct molding of these granular materials results in considerably poor thermal fluidity, and the resulting polyimide moldings do not show sufficient mechanical properties. In addition, such granular materials cannot be made into solution form because of their considerably low solubility in organic solvent.

SUMMARY OF THE INVENTION

In view of the above, an object of the present invention is to provide a granular material of a polyimide precursor, which has excellent solubility in an organic solvent and excellent moldability, and from which a polyimide molding having excellent mechanical properties can be produced.

Another object of the present invention is to provide a mixture of a granular material of a polyimide precursor with a solvent, in which the polyimide precursor exhibits excellent storage stability.

A further object of the present invention is to provide a process for the production of a granular material of a polyimide precursor, from which a solvent can be easily removed.

With the object of overcoming the aforementioned problems involved in the prior art, the inventors of the present invention conducted intensive studies and found that a solvent can be easily removed and a granular material of a polyimide precursor having an intrinsic viscosity of 0.7 or higher and with excellent solubility in organic solvent can be obtained when a tetracarboxylic dianhydride is dissolved or suspended in a solvent which does not exhibit a strong mutual interaction with the polyimide precursor and a diamine is added to the solution or suspension to effect the polymerization reaction of the dianhydride with the diamine. The present inventors also found that the resulting granular material of the polyimide precursor possesses excellent moldability, and that a polyimide molding prepared from the granular polyimide precursor material had excellent mechanical strength and contained no residual solvent. The present inventors further found that a polyimide precursor mixture consisting of the granular polyimide precursor material and a solvent which did not exhibit a strong mutual interaction with the polyimide precursor exhibited excellent storage stability of the polyimide precursor. The present invention was accomplished on the basis of these findings.

Thus, the gist of the present invention resides in:

(1) a granular material of a polyimide precursor having an intrinsic viscosity of 0.7 or higher;

(2) a polyimide precursor mixture which consists of a granular polyimide precursor material having an intrinsic viscosity of 0.7 or higher and a solvent that does not exhibit a strong mutual interaction with the polyimide precursor; and (3) a process for the production of the just described granular material of a polyimide precursor, which process comprises dissolving or suspending a tetracarboxylic dianhydride in a solvent that does not exhibit a strong mutual interaction with the polyimide precursor and then adding a diamine to the solution or suspension to effect the polymerization interaction of the dianhydride with the diamine.

DETAILED DESCRIPTION OF THE INVENTION

The polyimide precursor of the present invention is an organic polymer which becomes the corresponding polyimide by ring closure when the polyimide precursor heated or chemically treated. In thus obtained polyimide, 60 to 100 mol %, preferably 70 mol % or more, more preferably 80 mol % or more, of the repeating units of the polymer chain thereof has the polyimide structure as represented, for example, by the following formula (2):

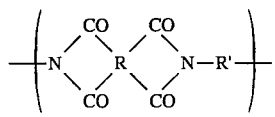
(2)

wherein R and R' are defined below.

Any type of organic polymer may be used, provided that it becomes a polyimide having a property of no thermal melting when it subjected to ring closure. The ring closure may be effected by conventionally used means such as a heat treatment or a process in which a cyclization agent such as pyridine and acetic anhydride, picoline and acetic anhydride, 2,6-lutidine and acetic anhydride, or the like is used as disclosed, for example, in Macromolecular Reviews, vol.11, pp.169–172 (1976).

Examples of preferred polyimide precursors include aromatic polyimide precursors which provide, when imidated, polyimides wherein a benzene ring of aromatic compounds is directly bonded to the imide group. Especially preferred examples of such polyimide precursors include poly(amic-acid)s having a repeating unit represented by the following general formula (1), which are either homopolymers or copolymers of two or more of the repeating units:

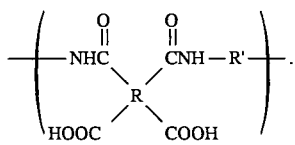
(1)

In the above formula, R is a tetravalent aromatic radical having 1 to 5 benzenoid-unsaturated rings of 6 carbon atoms, the four carbonyl groups being directly bonded to different carbon atoms in a benzene ring of the R radical and each pair of carbonyl groups being bonded to adjacent carbon atoms in the benzene ring of the R radical. The followings are illustrative examples of R:

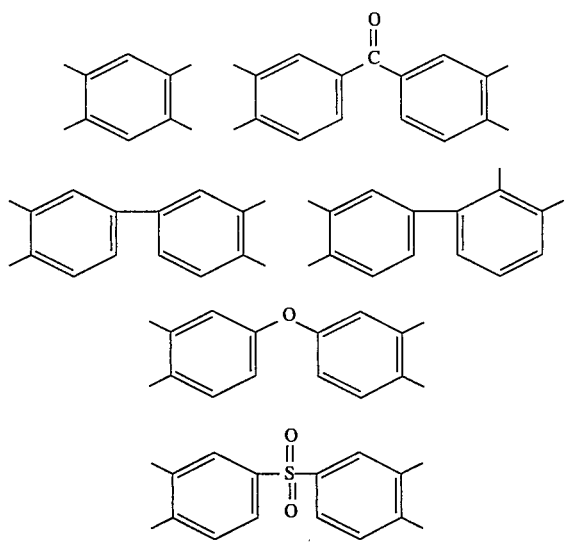

-continued

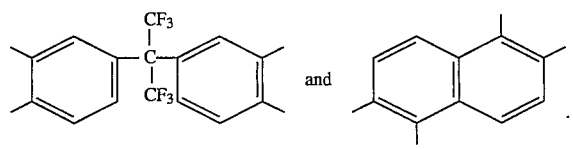
and

The followings are preferred examples of R:

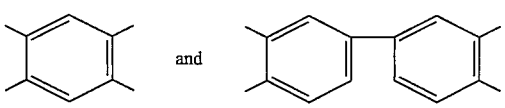
and

In the above general formula (1), R' is a divalent aromatic radical having 1 to 5 benzenoid-unsaturated rings of carbon atoms, the two amino groups being directly bonded to different carbon atoms in the benzene ring of the R' radical. The followings are illustrative examples of R':

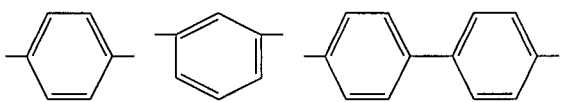

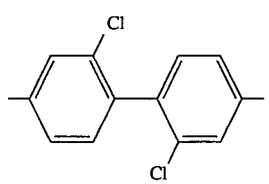

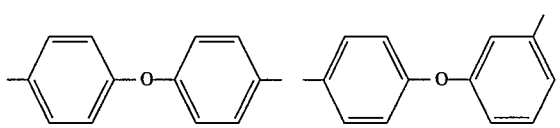

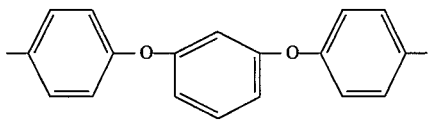

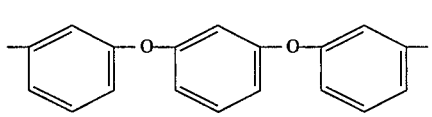

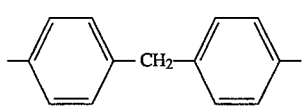

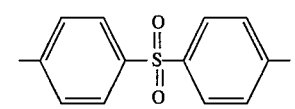

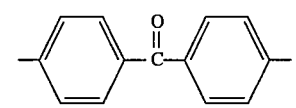

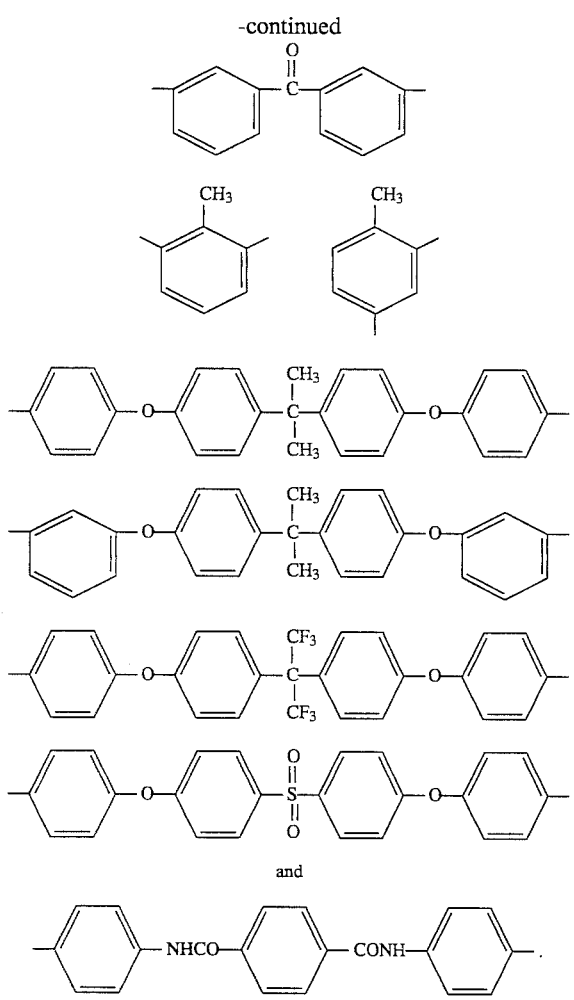

The following is a preferred example of R':

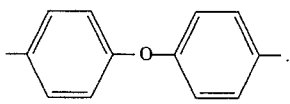

Most preferred examples of the poly(amic-acid) having the repeating unit represented by aforementioned general formula (1) are those obtained from pyromellitic dianhydride (PMDA) and diaminodiphenyl ether (DADE) and 3,3'-4,4'-biphenyltetracarboxylic dianhydride (BPDA) and DADE. When subjected to ring closure, the former becomes poly(4,4'-oxydiphenylenepyromellitimide) and the latter becomes poly(4,4'-oxydiphenylene-3,3'-4,4'-biphenyltetracarboxy imide).

The polyimide precursor in the present invention may be a copolymer which further contains 40 mol % or less, preferably 30 mol % or less, more preferably 20 mol % or less, based on the total weight of the copolymer, of other units such as amide, ether and ester.

The polyimide precursor in the present invention may have an intrinsic viscosity ($\eta$) of at least 0.7, preferably 1.0 or more, more preferably 1.5 or more. Higher ($\eta$) value will result in excellent strength, elasticity and the like properties when the polyimide precursor is subjected to ring closure. Though not particularly restricted, the upper limit of the intrinsic viscosity is preferably about 6. The intrinsic viscosity ($\eta$) is a value directly related to the molecular weight of a polymer and can be calculated using the following formula, after measuring the flow time of a polymer solution and a solvent therefor (N,N'-dimethylacetamide) at 30° C. through a constant volume capillary tube of a standard viscometer.

$$\text{Intrinsic viscosity} = \frac{\ln \frac{\text{flow time of solution}}{\text{flow time of solvent}}}{c}$$

(wherein in represents natural logarithm and c represents the gram-number of the polyimide precursor contained in 100 ml of the solution, i.e., 0.5)

The polyimide precursor of the present invention is produced by dissolving or suspending a tetracarboxylic dianhydride in a solvent which does not exhibit a strong mutual interaction with the polyimide precursor and then adding a diamine spending 5 to 60 minutes to the resulting solution or suspension to effect the polymerization reaction of the dianhydiride with the diamine.

In this instance, the term "a solvent which does not exhibit a strong mutual interaction with a polyimide precursor" means a solvent which does not dissolve the polyimide precursor, and the term "dissolve" means that the solvent can dissolve the polyimide precursor in an amount of 1 g/100 ml or more, i.e., a solvent which does not exhibit a strong mutual interaction with a polyimide precursor dissolves the polyimide precursor in an amount of 1 g/100 ml or less.

A preferred example of a solvent which does not exhibit a strong mutual interaction with a polyimide precursor may have such a character that it does not dissolve the polyimide precursor, as defined above, but dissolves at least the tetracarboxylic dianhydride or the diamine used. Illustrative examples of such a type of solvent include water soluble ether compounds such as tetrahydrofuran (THF), dioxane, trioxane, 1,2-dimethoxyethane, diethylene glycol dimethyl ether, diethylene glycol diethyl ether, 2-methoxyethanol, 2-ethoxyethanol, 2-(methoxymethoxy) ethoxyethanol, 2-isopropxyethanol, 2-butoxyethanol, diethylene glycol, diethylene glycol monomethyl ether, diethylene glycol monoethyl ether, diethylene glycol monobutyl ether, triethylene glycol, triethylene glycol monoethyl ether, tetraethylene glycol, 1-methoxy-2-propanol, 1-ethoxy-2-propanol, dipropylene glycol, dipropylene glycol monomethyl ether, dipropylene glycol monoethyl ether, tripropylene glycol monomethyl ether, polypropylene glycol and the like, of which THF is particularly preferred. These solvents may be used alone or as a mixture of two or more thereof.

The diamine used in the present invention may be a primary amine whrerein amino groups are directly bonded to an aromatic ring.

As described in the foregoing, the polyimide precursor of the present invention is produced by dissolving or suspending a tetracarboxylic dianhydride in a solvent which does not exhibit a strong mutual interaction with the polyimide precursor in the concentration, e.g., of 1 to 8 g/100 ml, and then adding a diamine to the resulting solution or suspension, at the molar ratio of the tetracarboxylic dianhydride to the diamine, e.g., of 0.95 to 1.05, to effect the polymerization reaction of the dianhydride with the diamine. In this instance, the polymerization reaction may be effected at a temperature of from −20° C. to 50° C., preferably from 0 to 30° C. for 1 to 4 hours. The diamine may be added as it is or as a solution or a suspension after dissolving or suspending it in a solvent as earlier exemplified which does not exhibit a strong mutual interaction with the polyimide precursor, in the concentration, e.g., of 1 to 6 g/100 ml.

When a polyimide precursor having high intrinsic viscosity is produced; it is important to add the diamine as it is or as a solution or a suspension to a solution or a suspension of a tetracarboxylic dianhydride. Since the polyimide precursor thus formed does not dissolve in the used solvent and therefore is suspended in the solvent, a solid granular polyimide precursor material can be obtained by removing the solvent in accordance with conventionally used means such as filtration using a glass filter, a paper filter, etc., drying or the like. Since a solvent which does not exhibit a strong mutual interaction with the polyimide precursor is used, removal of the solvent can be done easily, and a granular material or a final product of the polyimide precursor can be obtained with no residual solvent.

In this instance, extended storage stability of the polyimide precursor can be achieved when the granular material is stored in a state of containing about 10% by weight or more of a solvent which does not exhibit a strong mutual interaction with the polyimide precursor, by incompletely removing the solvent or by suspending the granular material again in the solvent. In other words, storage stability of the granular polyimide precursor material can be maintained by mixing it with a solvent which does not exhibit a strong mutual interaction with the polyimide precursor. Such solvents have been earlier exemplified.

The granular material of a polyimide precursor of the present invention may be in any desired shape such as in a spherical form, in an irregular form, in a fibrous form or the like. The size of the granular material of the present invention may fall within such range hat, when 100 g of the granular material is subjected to a 20-mesh sieve [JIS (Japanese Industrial Standard) standard sieve], 50 to 100 g of the material can pass through the sieve. Preferably, at least 80% by weight of the granular material has a particle size of 500 µm or below.

A polyimide molding having excellent properties can be obtained from the granular polyimide precursor material of the present invention in a conventional manner. For example, a molded polyimide product can be obtained by subjecting the polyimide precursor to press molding at a temperature of from 10° to 50° C. under a pressure of from 100 to 3,000 kg/cm$^2$ and increasing the temperature in vacuo (lower than 10 mmHg) to a final temperature of 400° C. at a rate of 4° C./min. As an alternative, a part of the repeating units (80 to 99 mol %) of the poly(amic-acid) may be converted into imide ring by heating at a temperature of from 100° to 300° C. in an atmosphere of air. And the resulting granular may be molded into a desired shape by heating at 300° to 400° C. under a pressure of from 100 to 3,000 kg/cm$^2$.

The granular polyimide precursor material of the present invention can be applied to various purposes when the granular material is made into a uniform solution by dissolving it in an appropriate solvent which does not exhibit a strong solvation with the polyimide precursor. The term "strong solvation" means strong association of a solute and a solvent, or a substantial interaction between the solvent and a polyimide precursor as the solute in a polyimide precursor solution. The degree of solvation can be judged, for example, on the basis of the solvation index measured by the following procedure: a 5,000 mg portion of a solution containing 300 mg of a polyimide precursor is uniformly poured in a conventional glass dish having an inner diameter of 86 mm and a height of 18 mm and air-dried at 20° C. until the content does not flow when the glass dish is slanted at an angle of 40 degree; thereafter, the solvent is removed by distillation at 40° C. for 40 hours under a reduced pressure of 10 mmHg and the weight of the polyimide precursor remaining in the dish is weighed; and the solvation index is then calculated using the following formula:

$$\frac{A-300}{300}$$

where A is weight (mg) of the dried polyimide precursor.

According to the present invention, the solvent used cannot have strong solvation with a polyimide precursor. A preferred solvation index of the solution is less than 0.35, more preferably 0.1 to 0.3 (a solution wherein the solvation index between a solvent and a solute is 0.35 or more should be considered as a "strong solvation"). As a solvent which does not strongly solvate with the polyimide precursor, a solvent having a dipole moment of 3 debyes or less is preferably used. In general, one which is a poor solvent for the polyimide precursor when used as a single solvent but is a good solvent when used as a mixture with other solvents is preferably used.

Preferred examples of good solvents include mixed solvents selected from the group consisting of water soluble ether compounds, water soluble alcohol compounds, water soluble ketone compounds and water, or a water soluble compound having an ether group and an alcoholic hydroxyl group in the same molecule.

Preferred combinations of mixed solvents for use in the preparation of a uniform solution are a water soluble ether compound with water, a water soluble ether compound with a water soluble alcohol compound or a water soluble ketone compound with water. A preferred mixing ratio (weight ratios) in the mixed solvent is in the range of from 99.9:0.1 to 65:35, more preferably from 96:4 to 79:21, in the case of a water soluble ether compound with water; in the case of a water soluble ether compound with a water soluble alcohol compound, it is in the range of from 99.9:0.1 to 25:75, more preferably from 90:10 to 56:44; and, in the case of a water soluble ketone compound with water, it is in the range of from 99.9:0.1 to 40:60, more preferably from 90:10 to 65:35.

Illustrative examples of the water soluble ether compounds include THF, dioxane, trioxane, 1,2-dimethoxyethane, diethylene glycol dimethyl ether, diethylene glycol diethyl ether and the like, of which THF is particularly preferred.

Illustrative examples of the water soluble alcohol compounds include methanol, ethanol, 1-propanol, 2-propanol, tert-butyl alcohol, ethylene glycol, 1,2-propanediol, 1,3-propanediol, 1,3-butanediol, 1,4-butanediol, 2,3-butanediol, 1,5-pentanediol, 2-butene-1,4-diol, 2-methyl-2,4-pentanediol, glycerol, 2-ethyl-2-hydroxymethyl-1,3-propanediol, 1,2,6-hexanetriol and the like, of which methanol, ethanol and ethylene glycol are particularly preferred.

Illustrative examples of the water soluble ketone compounds include acetone, methyl ethyl ketone and the like, of which acetone is particularly preferred.

Illustrative examples of the water soluble solvent having an ether group and an alcoholic hydroxyl group in the same molecule include 2-methoxyethanol, 2-ethoxyethanol, 2-(methoxymethoxy) ethoxyethanol, 2-isopropxyethanol, 2-butoxyethanol, tetrahydrofurfuryl alcohol, diethylene glycol, diethylene glycol monomethyl ether, diethylene glycol monoethyl ether, diethylene glycol monobutyl ether, triethylene glycol, triethylene glycol monoethyl ether, tetraethylene glycol, 1-methoxy-2-propanol, 1-ethoxy-2-propanol, dipropylene glycol, dipropylene glycol monomethyl ether, dipropylene glycol monoethyl ether, tripropylene glycol monomethyl ether, polyethylene glycol, polypropylene glycol and the like, of which 2-methoxyethanol and tetrahydrofurfuryl alcohol are particularly preferred.

A preferred concentration of a polyimide precursor in the polyimide precursor solution of the present invention is in the range of from 0.1 to 60% by weight, more preferably from 1 to 25% by weight, most preferably from 5 to 20% by weight, based on the total weight of the solution.

When the polyimide precursor is made into a uniform solution, it can be used as a varnish, an adhesive material and the like, and a film, a coating and the like can be formed from such a solution in a conventional manner. For example, a polyimide film may be obtained by dissolving the granular polyimide precursor material in an appropriate solvent which does not strongly solvate with the polyimide precursor, casting the thus prepared polyimide precursor solution on an appropriate base material (such as a glass plate) at 60° to 100° C. in an atmosphere of air to a desired thickness (e.g., 1 to 100 μm) using a film applicator, removing the solvent from the cast solution and then heating the resulting film at 150° to 300° C. for a period of 0.5 to 5 hours in an atmosphere of inert gas such as nitrogen and argon under a pressure of 1 to 800 mmHg to effect the imidation reaction. In the same manner, a base material can be coated with a polyimide by applying the polyimide precursor solution to the base material of interest and drying and heating the applied solution.

In addition, when required, conventional additive agents may be added to the granular polyimide precursor material of the present invention, or to a uniform solution prepared by dissolving the granular material in an appropriate solvent, in such amounts that they do not harm the effects of the present invention. Examples of such additive agents include pigments, fillers such as conductive carbon black and metal particles, abrasion agents, dielectric substances, lubricants and the like. Other polymers and water insoluble solvents such as ethers, alcohols, ketones, esters, halogenated hydrocarbons, hydrocarbons and the like may also be used as additives in such amounts that they do not harm the effects of the present invention.

When the granular polyimide precursor material of the present invention is dissolved in an appropriate solvent, the resulting polyimide precursor solution can be used in the production, for example, of a heat resistant insulating tape, a heat resistant adhesive tape, a high density magnetic recording base, a condenser, a film for FPC (flexible printed circuit) use and the like. It is also useful for the production of: molding materials and moldings such as a sliding means in which fluoride resin, graphite or the like is packed, a structural element reinforced with glass fiber, carbon fiber or the like, a bobbin for miniature coil use, a sleeve, and the like; laminated materials such as an insulating spacer for power transistor use, a magnetic head spacer, a power relay spacer, a transformer spacer and the like; and enamel coating materials for use in insulation coating of electric wires and cables, a solar battery, a low temperature storage tank, a space heat insulator, an integrated circuit, a slot liner and the like. It is also useful for the production of an ultrafiltration membrane, a gas separation membrane and the like.

The following inventive and comparative examples are provided to further illustrate the present invention. It is to be understood, however, that the examples are for purpose of illustration only and they are not intended as a definition of the limits of the invention. Unless otherwise indicated, all percentages are by weight based on the total composition at issue and reactions were carried out in an atmosphere of an inert gas.

EXAMPLE 1

A 21.9 g portion of pyromellitic dianhydride was dissolved in 500 ml of THF (substantially anhydrous) at 0° C. To this solution there was gradually added 500 ml of THF (substantially anhydrous) in which 20.0 g of diaminodiphenyl ether had been dissolved spending 30 minutes. The resulting solution was incubated at 0° C. for 2 hours to obtain a suspension of poly(amic-acid). Thereafter, the poly(amic-acid) was separated from the suspension using a glass filter to obtain granular poly(amic-acid). The intrinsic viscosity ($\eta$) of the poly(amic-acid) was found to be 1.50.

EXAMPLE 2

A suspension (mixture) containing poly(amic-acid) was obtained by repeating the procedure of Example 1, except that 20.0 g of diaminodiphenyl ether was added as powder to 1,000 ml of THF (substantially anhydrous) in which 21.9 g of pyromellitic dianhydride has been dissolved. The intrinsic viscosity ($\eta$) of the poly(amic-acid) was found to be 1.49.

COMPARATIVE EXAMPLE 1

A suspension containing poly(amic-acid) was obtained by repeating the procedure of Example 1, except that the mixing of the THF solutions was conducted in the contrary order, i.e., the THF solution of pyromellitic dianhydride was added to the THF solution of diaminodiphenyl ether. The poly(amic-acid) was separated from the suspension to obtain granular poly(amic-acid). The intrinsic viscosity ($\eta$) of the poly(amic-acid) was found to be 0.52.

COMPARATIVE EXAMPLE 2

A poly(amic-acid) solution was obtained by allowing 37.5 g of pyromellitic dianhydride to react with 30.0 g of diaminodiphenyl ether in 600 ml of dimethylacetamide, which was not a solvent that did not exhibit a strong mutual interaction with a polyimide precursor, at 20° C. for 1 hour. The intrinsic viscosity ($\eta$) of the poly(amic-acid) was found to be 1.72.

To each of the granular poly(amic-acid) material suspension obtained in Example 1 and the poly(amic-acid) solution obtained in Comparative Example 2 there was added water to a concentration of 50 ppm, 0.4% or 4%. The thus prepared samples were maintained at 25° C. to measure changes in the viscosity thereof during a storage and to compare their moisture resistance. The results are shown in Table 1.

TABLE 1

|  | Moisture content | Intrinsic viscosity ($\eta$) | | |
| --- | --- | --- | --- | --- |
|  |  | 1 day | 5 days | 10 days |
| Example 1 | 50 ppm | 1.50 | 1.52 | 1.51 |
| Comp. Ex. 2 | 50 ppm | 1.70 | 1.60 | 1.48 |
| Example 1 | 0.4% | 1.48 | 1.49 | 1.51 |
| Comp. Ex. 2 | 0.4% | 1.69 | 1.50 | 1.33 |
| Example 1 | 4% | 1.50 | 1.51 | 1.49 |
| Comp. Ex. 2 | 4% | 1.65 | 1.23 | 1.00 |

As is evident from the above table, when a polyimide precursor is mixed with a solvent which does not exhibit a strong mutual interaction with the polyimide precursor, a hydrolysis-caused decrease in viscosity does not occur in the resulting polyimide precursor mixture even in the presence of water in a mixed system thereof due to moisture absorption.

EXAMPLE 3

A 2.96 g portion of biphenyltetracarboxylic dianhydride was suspended in 50 ml of THF (substantially anhydrous), and the resulting suspension was maintained at 0° C. To this suspension there was gradually added 50 ml of THF (substantially anhydrous) in which 2.00 g of diaminodiphenyl ether had been dissolved. The resulting mixture was incubated at 0° C. for 2 hours to obtain a suspension of poly(amic-acid). Thereafter, the poly(amic-acid) was separated from the suspension to obtain granular poly(amic-acid). The intrinsic viscosity ($\eta$) of the poly(amic-acid) was found to be 2.19.

COMPARATIVE EXAMPLE 3

A 1.00 g portion of diaminodiphenyl ether was dissolved in 50 ml of THF (substantially anhydrous), and the resulting solution was maintained at 0° C. To this solution there was gradually added 1.48 g of biphenyltetracarboxylic dianhydride as powder. The resulting mixture was incubated at 0° C. for 2 hours to obtain a suspension of poly(amic-acid). Thereafter, the poly(amic-acid) was separated from the suspension to obtain granular poly(amic-acid). The intrinsic viscosity (h) of the poly(amic-acid) was found to be 0.45.

EXAMPLE 4

A 2.19 g portion of pyromellitic dianhydride was suspended in 50 ml of diethylene glycol dimethyl ether, and the resulting mixture was maintained at 0° C. To this mixture there was gradually added 50 ml of diethylene glycol dimethyl ether in which 2.00 g of diaminodiphenyl ether had been dissolved. The resulting mixture was incubated at 0° C. for 2 hours to obtain a suspension of poly(amic-acid). Thereafter, the poly(amic-acid) was separated from the suspension to obtain granular poly(amic-acid). The intrinsic viscosity ($\eta$) of the poly(amic-acid) was found to be 0.83.

EXAMPLE 5

A 1.64 g portion of pyromellitic dianhydride was dissolved in 50 ml of 1,2-dimethoxyethane, and the resulting solution was maintained at 0° C. To this solution there was gradually added 50 ml of 1,2-dimethoxyethane in which 1.50 g of diaminodiphenyl ether had been dissolved. The resulting solution was incubated at 0° C. for 2 hours to obtain a suspension of poly(amic-acid). Thereafter, the poly(amic-acid) was separated from the suspension to obtain granular poly(amic-acid). The intrinsic viscosity ($\eta$) of the poly(amic-acid) was found to be 0.75.

EXAMPLE 6

A 1.09 g portion of pyromellitic dianhydride was suspended in 25 ml of dioxane, and the resulting solution was maintained at 0° C. To this solution there was gradually added 25 ml of dioxane in which 1.00 g of diaminodiphenyl ether had been dissolved. The resulting solution was incubated at 0° C. for 2 hours to obtain a suspension of poly(amic-acid). Thereafter, the poly(amic-acid) was separated from the suspension to obtain granular poly(amic-acid). The intrinsic viscosity ($\eta$) of the poly(amic-acid) was found to be 0.82.

EXAMPLE 7

Each of the poly(amic-acid) granular materials obtained in Example 1 and Comparative Example 1 was molded at 20° C. under a pressure of 3,000 kg/cm$^2$. The temperature of the molded product was gradually increased from 20° C. to 400° C. in a vacuum oven undre a pressure of 10 mmHg spending 100 hours, kept at 400° C. for 10 hours and then gradually cooled down to 20° C. spending 25 hours. The physical properties of the thus obtained polyimide moldings are shown in Table 2.

TABLE 2

|  | Bending strength (kg/mm$^2$) | Flexual modulus (kg/mm$^2$) |
| --- | --- | --- |
| Example 1 | 10.5 | 365 |
| Comp. Ex. 1 | 7.3 | 321 |

EXAMPLE 8

The poly(amic-acid) granular material obtained in Example 1 was dissolved in THF and water to prepare a poly(amic-acid) solution consisting of 16.7% by weight of the poly(amic-acid) granular material, 80.0% by weight of THF and 3.3% by weight of water. The thus prepared poly(amic-acid) solution was deposited evenly on a glass plate at a thickness of 250 m by moving a film applicator at a rate of 25 mm/second. After 30 minutes of drying at 20° C., the resulting film was peeled off from the glass plate and soaked in an acetic anhydride/pyridine solvent system (70/30 in volume ratio) for 12 hours to effect ring closure. Thereafter, the thus treated film was washed with an excess amount of toluene at 20° C. in an atmosphere of air to extract the cyclization agent and then dried at 80° C. for 120 minutes under atmospheric pressure. The film obtained in this way was transparent with a bright yellow color and highly uniform. It had a thickness of 20 mm and a tensile strength of 14.6 kg/mm$^2$ and showed no evidence of carbon monoxide generation even when heated at a high temperature.

EXAMPLE 9

The poly(amic-acid) granular material obtained in Example 1 was dissolved in THF and methanol to prepare a poly(amic-acid) solution consisting of 8.0% by weight of the poly(amic-acid), 73.6% by weight of THF and 18.4% by weight of methanol. The thus prepared poly(amic-acid) solution was subjected to spinning at a spinning rate of 10 m/min by delivering the solution through a nozzle (0.08 mm$\emptyset \times 20$ holes) at a delivery rate of 1.5 ml/min into a coagulation bath containing water at 20° C. The resulting thread was drawn to about 1.5 times its original length in water at 20° C., wound up on a roll and air-dried at 20° C. for 60 minutes. After further drying at 80° C. for 120 minutes in an atmosphere of air, the resulting thread was heated at 300° C. for 60 minutes in an atmosphere of nitrogen under a pressure of 1 mmHg to effect thermal ring closure. The thread obtained in this way was yellowish brown and had a modulus of elasticity of 73 g/d.

EXAMPLE 10

The poly(amic-acid) granular material obtained in Example 1 was dissolved in THF and methanol to prepare a poly(amic-acid) solution consisting of 6.0% by weight of the poly(amic-acid), 75.8% by weight of THF and 18.2% by weight of methanol. The thus prepared poly(amic-acid) solution was deposited evenly on a surface-treated copper foil having a thickness of 25 μm in a thickness of 1,500 μm at a rate of 40 mm/second using a film applicator. After 30 minutes of drying by air drying at 20° C., the resulting foil was heated at 200° C. for 15 hours in a vacuum oven to effect thermal ring closure. The coating obtained in this way was transparent with a deep yellow color and rigidly adhered to the surface of the copper foil. When the copper foil was removed by etching, the remaining coat had a thickness of 35 μm and a tensile strength of 15.9 kg/mm$^2$.

EXAMPLE 11

The poly(amic-acid) granular material obtained in Example 1 was dissolved in acetone and water to prepare a poly(amic-acid) solution consisting of 15.3% by weight of the poly(amic-acid) granular material, 73.9% by weight of acetone and 10.8% by weight of water. The thus prepared poly(amic-acid) solution was treated in the same manner as described in Example 10 to obtain a coating having a thickness of 30 μm and a tensile strength of 15.4 kg/mm$^2$.

Thus, it is apparent that there have been provided, in accordance with the present invention, a granular material of a polyimide precursor, a mixture comprising the granular material and a process for the production of the granular material. The polyimide precursor granular material of the present invention has excellent moldability, and the polyimide moldings formed therefrom possess excellent mechanical properties and are almost free from residual solvent. Since the granular material is highly soluble in organic solvents, it can be used as a solution which finds versatile use in various applications. Also, the mixture comprising the polyimide precursor granular material of the present invention can maintain the polyimide precursor granular material with high storage stability. In addition, according to the production process of the present invention, a polyimide precursor granular material can be produced easily and solvents can be removed easily.

Although some preferred embodiments have been described, many modifications and variations may be made thereto in the light of the above teachings. It is to be understood therefore that within the scope of the appended claims, the invention may be practiced otherwise than as specifically described.

What is claimed is:

1. A poly(amic acid) powder comprising repeating units represented by formula (1):

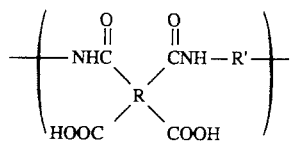

(1)

wherein R is a tetravalent aromatic radical having 1 to 5 benzenoid-unsaturated rings of 6 carbon atoms, the four carbonyl groups being directly bonded to different carbon atoms in a benzene ring of the R radical and each pair of carbonyl groups being bonded to adjacent carbon atoms in the benzene ring of the R radical; and R' is a divalent aromatic radical having 1 to 5 benzenoid-unsaturated rings of 6 carbon atoms, the amino groups being directly bonded to different carbon atoms in a benzene ring of the R' radical, said powder having:

(1) an intrinsic viscosity of 0.7 or more, and (2) a solubility in tetrahydrofuran of 1 g/100 ml or less.

2. A poly(amic acid) mixture which comprises the poly(amic acid) powder of claim 1 and a solvent which dissolves the poly(amic acid) in an amount of 1 g/100 ml or less.

3. A process for producing the poly(amic acid) powder of claim 1, which comprises dissolving or suspending an aromatic tetracarboxylic dianhydride in a solvent which dissolves the poly(amic acid) in an amount of 1 g/100 ml or less, adding an aromatic diamine to the resulting solution or suspension, effecting polymerization at a temperature of from −20° C. to 50° C. to obtain a suspension of the poly(amic acid) powder, and separating the resulting solid poly(amic acid) powder from the suspension, wherein the poly(amic acid) powder comprises repeating units represented by formula (1):

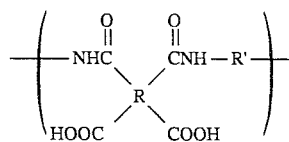

(1)

wherein R is a tetravalent aromatic radical having 1 to 5 benzenoid-unsaturated rings of 6 carbon atoms, the four carbonyl groups being directly bonded to different carbon atoms in a benzene ring of the R radical and each pair of carbonyl groups being bonded to adjacent carbon atoms in the benzene ring of the R radical; and R' is a divalent aromatic radical having 1 to 5 benzenoid-unsaturated rings of 6 carbon atoms, the amino groups being directly bonded to different carbon atoms in a benzene ring of the R' radical, said powder having:

(1) an intrinsic viscosity of 0.7 or more, and (2) a solubility in tetrahydrofuran of 1 g/100 ml or less.

4. A polyimide molding which is obtained by molding the poly(amic acid) powder of claim 1, wherein said molding is conducted at a temperature and pressure sufficient to cause a ring closure reaction of the poly(amic acid).

5. A process for producing a polyimide molding which comprises dissolving the poly(amic acid) powder of claim 1 in a solvent that provides a poly(amic acid) solution having a solvation index of less than 0.35 and subjecting the resulting solution to a molding step, wherein said molding is conducted at a temperature and pressure sufficient to cause a ring closure reaction of the poly(amic acid).

6. A process for producing a polyimide coating which comprises dissolving the poly(amic acid) powder of claim 1 in a solvent that provides a poly(amic acid) solution having a solvation index of less than 0.35 and applying the resulting solution on a base material, wherein the applying is in air, whereafter the solution is dried and the resulting dried poly(amic acid) is heated for a period of time under an inert atmosphere to effect the ring closure reaction.

7. A process according to claim 2, wherein the molar ratio of said aromatic tetracarboxylic dianhydride to said aromatic diamine is 0.95 to 1.05.

8. A process for producing a poly(amic acid) powder according to claim 3, wherein R is

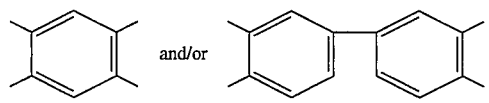 and/or
and R' is
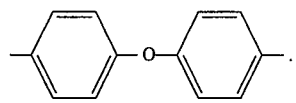
9. A process for producing a poly(amic acid) powder according to claim 8, wherein
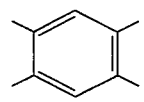
10. A process for producing a poly(amic acid) powder according to claim 8, wherein
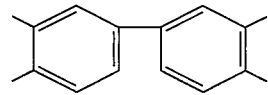
11. A poly(amic acid) powder as claimed in claim 1, wherein R is
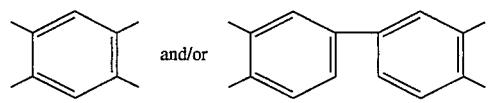 and/or
and R' is
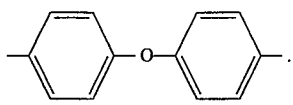
12. A poly(amic acid) powder as claimed in claim 1, wherein R is
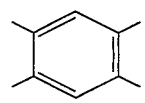
13. A poly(amic acid) powder as claimed in claim 1, wherein
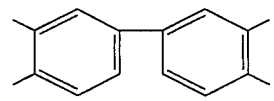
* * * * *